United States Patent [19]

Kokenge et al.

[11] 4,361,099

[45] Nov. 30, 1982

[54] SHELF APPARATUS

[75] Inventors: Elmer J. Kokenge, Cincinnati; C. William Carlson, Hamilton; F. A. Backscheider, Batavia; William M. Campbell, Cincinnati, all of Ohio

[73] Assignee: Schulte Corporation, Cincinnati, Ohio

[21] Appl. No.: 163,650

[22] Filed: Jun. 27, 1980

[51] Int. Cl.³ ............................................. A47B 5/00
[52] U.S. Cl. .................................. 108/152; 108/108; 108/134; 211/134; 211/182; 248/250
[58] Field of Search ............... 108/152, 134, 108, 109; 248/74 B, 74 PB, 235, 250; 411/34, 38; 24/255 SL, 249 R, 257; 211/134, 182; 312/238, 245

[56] References Cited

U.S. PATENT DOCUMENTS

| | | | |
|---|---|---|---|
| 1,918,457 | 7/1933 | Dowell | 248/250 X |
| 2,604,375 | 7/1952 | Beckett | 312/214 X |
| 2,919,816 | 1/1960 | Maslow | 211/182 X |
| 3,311,073 | 3/1967 | Colledge | 108/152 X |
| 3,355,134 | 11/1967 | Chesley | 248/150 |
| 3,419,155 | 12/1968 | Black et al. | 248/250 X |
| 3,444,596 | 5/1969 | Soltysik | 248/73 |
| 3,471,112 | 10/1969 | MacDonald | 108/109 X |
| 3,515,363 | 6/1970 | Fisher | 248/74 PB |
| 3,527,175 | 9/1970 | Kapnek | 108/152 |
| 3,631,821 | 1/1972 | Zachariou | 108/152 |
| 4,185,566 | 1/1980 | Adams | 108/152 |
| 4,220,301 | 9/1980 | Jakobs et al. | 248/74 PB |
| 4,250,815 | 2/1981 | Swanson | 108/108 |
| 4,269,106 | 5/1981 | Leibhard et al. | 411/34 |

Primary Examiner—James T. McCall
Attorney, Agent, or Firm—Frost & Jacobs

[57] ABSTRACT

Apparatus for securing a steel rod shelf to a vertical wall including a back clip anchor for lockingly engaging the rear support rod of the shelf and being mountable to the wall by means of an expandable anchor, a support brace for lockingly engaging and supporting the front support rods of the shelf, an end bracket for supporting an end of the shelf including a pair of spaced expandable anchors mountable to the vertical wall, and an expandable anchor for mounting the support brace to the wall. The back clip anchors and expandable anchors are fabricated from nylon or other flexible plastic material. The shelf apparatus is specifically designed to insure rapid and reliable installation particularly on walls constructed of dry wall or the like.

10 Claims, 8 Drawing Figures

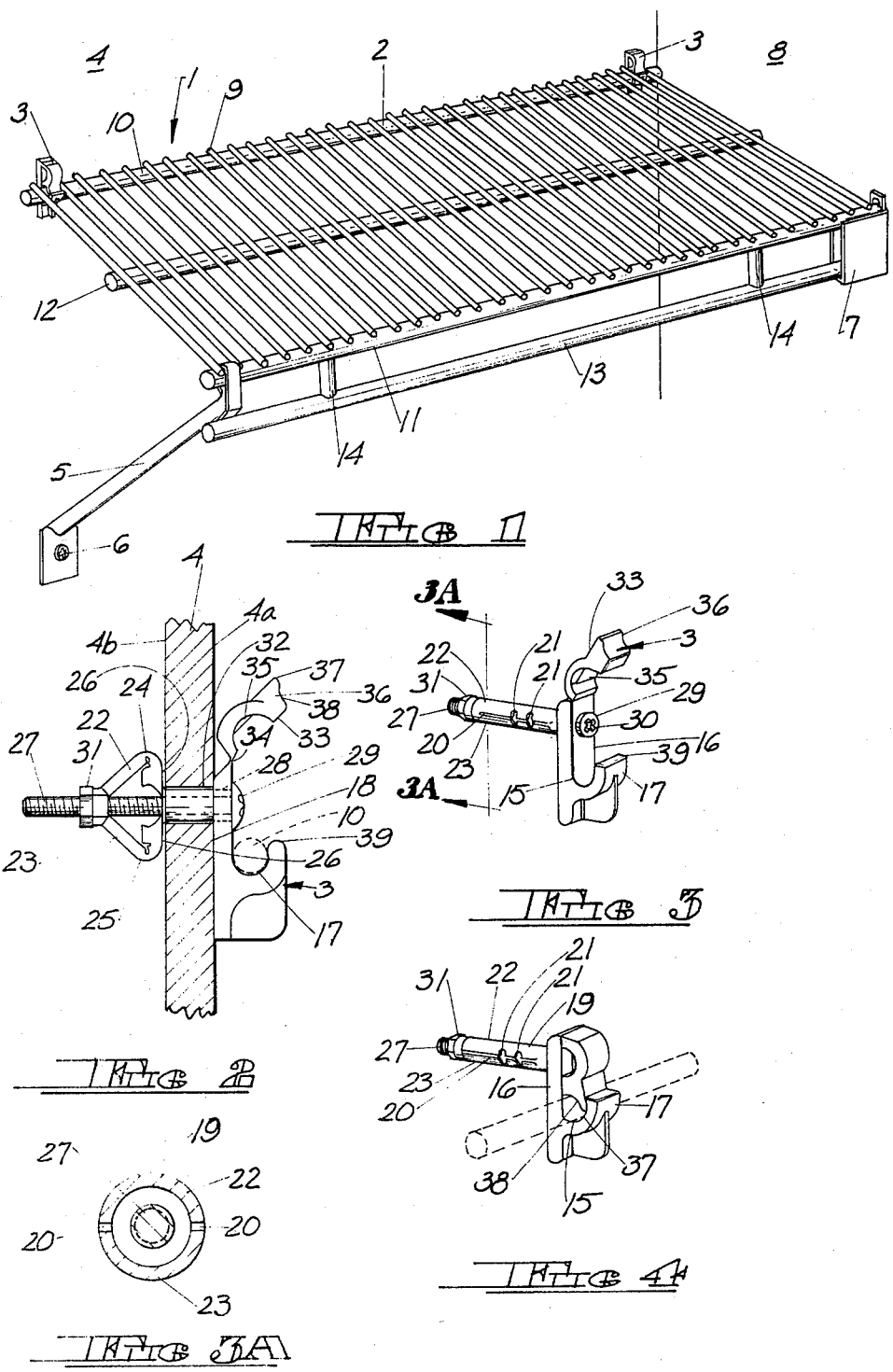

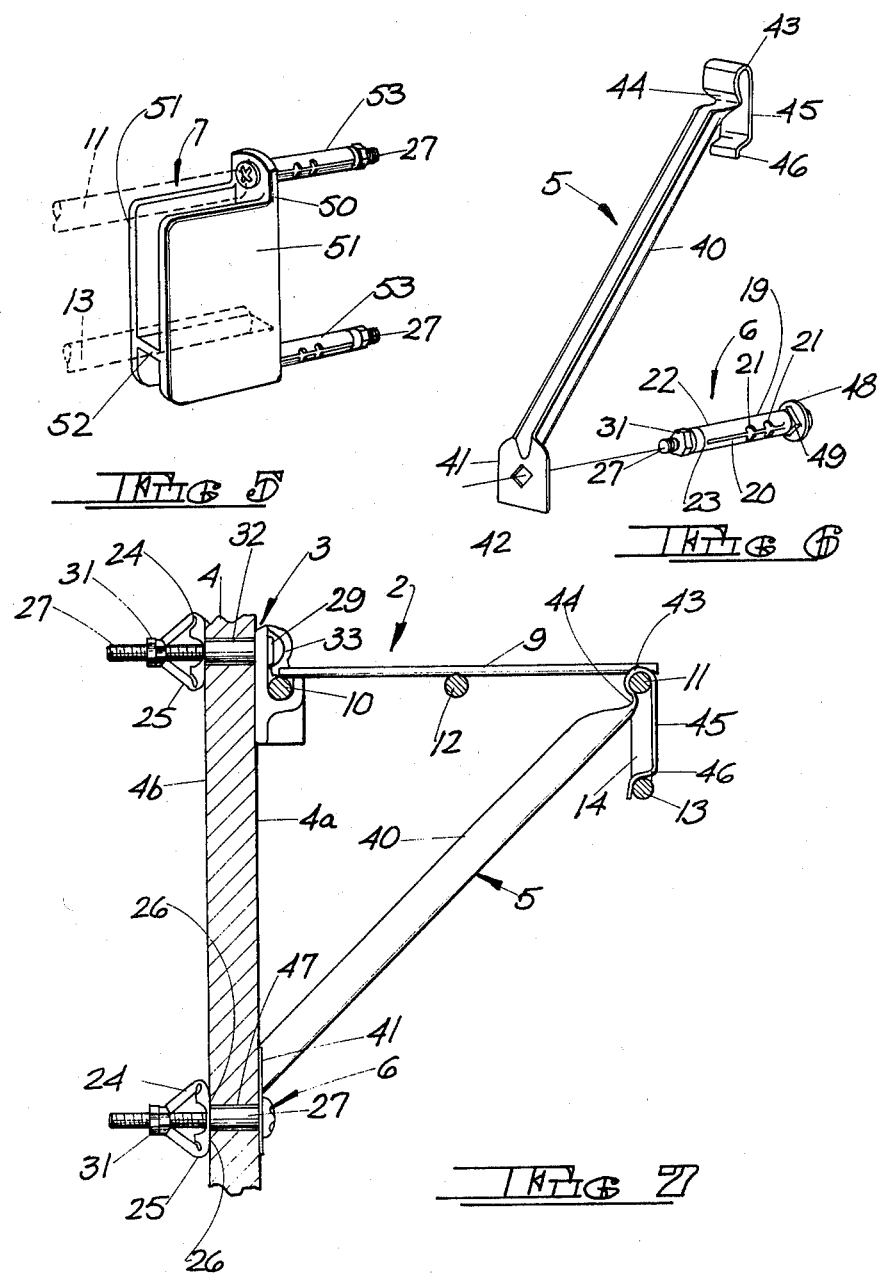

SHELF APPARATUS

SUMMARY OF THE INVENTION

The present invention is directed to a shelf and more particularly to a steel rod shelf structure having means adapted to facilitate mounting of the shelf to walls constructed from dry wall or the like.

While conventional wooden shelving has continued to dominate in fulfilling the need for additional storage space in single and multiple-family residence constructions, the use of steel rod shelving is rapidly becoming a viable low cost alternative as the cost of wood increases. Such shelving generally consists of a number of parallel spaced transversely extending cold drawn steel rods resistance welded to one or more longitudinally extending support rods. The shelving, which may be provided in a wide variety of lengths and widths, is then secured to a desired supporting wall by means of any type of well known mounting devices or fasteners.

It has been found that a very important consideration in the design of such steel rod shelving is the ease of installation of the shelf and mounting supports. Since such shelving may often be installed by relatively unskilled home owners, the shelf mounting devices must be relatively simple and require the use of only common hand tools. In addition, since the overwhelming majority of installations of shelving occur in single or multiple-family dwelling units, the mounting devices must provide a reliable securement to walls constructed from dry wall having a thickness of one half inch or less often used as the supporting walls in such dwelling units.

The present invention provides shelving apparatus which can be efficiently and reliably mounted to any vertical wall surface, particularly those constructed from dry wall or the like. In a preferred embodiment, the shelf structure itself comprises a plurality of parallel spaced transversely extending tubular rods resistance welded to a longitudinally extending support rod extending along the rear edge of the shelf surface, and by a similar longitudinally extending rod extending along the forward edge of the shelf surface. To provide additional support, intermediate longitudinally extended rods may be provided as well. A lower forward support rod is vertically spaced beneath the support bar spanning the front edge of the shelf, and is attached thereto by a number of spaced vertically extending attachments.

The rear support rod is secured to the wall surface by means of a plurality of spaced back clip anchors. Each anchor includes a J-shaped hanger element having a planar web portion terminating at its lower end in a forwardly directed upturned arcuate portion dimensioned to accept the rear rod support member, with the rear surface of the web portion being configured to abut the adjacent vertical wall surface. A hollow cylindrical sleeve constructed of a flexible nylon material extends rearwardly from the web portion, the sleeve includes a pair of diametrically opposed slits extending longitudinally through the walls of the sleeve from a point spaced from the forward end of the sleeve a distance approximately equal to the wall thickness, to a point spaced from the rearward end of the sleeve. A pair of spaced oval-shaped cutouts intersect along their minor diameters each of the slits, the areas between the slits forming a pair of flexible strips. The strips are configured to bend outwardly to form a pair of oppositely directed outwardly extending V-shaped ears having forward surfaces configured to be urged against the rear surface of the wall. Means are provided for drawing the rearwardmost end of the sleeve toward the web portion in the form of a bolt threadedly engaging the end of the sleeve, such that the strips bend outwardly near the cutouts to form the outwardly directed ears.

A clip portion having one end hingedly secured to the upper end of the web portion is also provided, with the lower end of the clip portion terminating in an outwardly extending tab, such that the tab may be locked in place within the arcuate portion of the anchor when the clip portion is pivoted toward the arcuate portion to prevent displacement of the rear shelf support member from within the arcuate portion.

The forward edge of the shelf is supported by means of a support brace comprising a rigid channel-shaped brace member terminating at one end in a flat angularly disposed tab member for mounting the brace to a vertical wall surface such that the brace extends upwardly and forwardly between the wall and the forward edge of the shelf. The opposite end of the brace member terminates in clip means for engaging the vertically spaced support rods at the front edge of the shelf, the clip means comprising an arcuate portion configured to slip over the upper one of the forward support rod members, an oppositely arcuate portion joining the arcuate portion to the brace member, and a planar portion connected to the arcuate portion at an angle of about 45°–90° with respect to the brace member. The planar member terminates in a rearwardly directed hook-like tab configured to abut the rearward surface of the lower shelf support rod member, the brace being bendable downwardly along the arcuate portions to lock the upper shelf support rod member within the arcuate portion such that the mounting tab abuts the vertical wall. This installation can be accomplished in a single operation, and securely locks the support brace to the forward portion of the shelf to prevent displacement.

In installations where the side edges of the shelf must be supported, the present invention includes an end bracket for supporting the shelf between parallel spaced vertical walls, including a vertical web portion having a a rear surface configured to abut the front surface of the adjacent wall, a pair of spaced generally vertical flange portions extending forwardly from the outer edges of the web portion, a horizontally extending member supported along its edges by the web and flange members for supporting one of the shelf support members, and means for attaching the bracket to the wall in a manner similar to that described for the back clip anchor.

As will be described in more detail hereinafter, the back clip anchor and the end bracket may be molded or cast in one piece from a suitable plastic material to facilitate installation and provide secure mounting of the shelf to the wall surfaces. Other features of the invention will become apparent from the detailed description which follows.

BRIEF DESCRIPTION OF THE DRAWING

FIG. 1 is a front perspective view of the shelf assembly of the present invention illustrating the shelf mounted to adjoining rear and side walls.

FIG. 2 is a fragmentary enlarged cross-sectional view of the back clip anchor of the present invention secured in place to a vertical wall surface.

FIG. 3 is a front perspective view of the back clip anchor of the present invention.

FIG. 3A is an enlarged cross-sectional view taken along section line 3A—3A of FIG. 3.

FIG. 4 is a front perspective view of the back clip anchor of FIG. 3 shown in the locked position.

FIG. 5 is a front perspective view of the end bracket of the present invention.

FIG. 6 is a perspective view of the support brace of the present invention in combination with a mounting anchor.

FIG. 7 is a fragmentary enlarged side elevation cross-sectional view of the shelf assembly of the present invention installed on a vertical wall surface.

DETAILED DESCRIPTION

The shelf assembly of the present invention is illustrated generally at 1 in the perspective view of FIG. 1, and includes a horizontally mounted shelf 2, a plurality of spaced back clip anchors 3 for securing the rear edge of the shelf 2 to a rear vertical wall surface 4, an angularly extending support brace 5 for supporting the front edge of the shelf to the rear wall surface 4 by means of an anchor member 6, and an end bracket 7 for supporting the forward corner of shelf 2 on a vertical side wall surface 8 adjoining rear wall surface 4. In general, rear wall 4 and side wall 8 will be of dry wall construction, having a thickness of one half inch or less, such as the typical wall section illustrated in FIG. 2 or FIG. 7.

Shelf 2 includes a plurality of transversely extending parallel spaced rod members, one of which is shown at 9, which form the horizontal supporting surface of shelf 2. Rod members 9 are supported at their rear ends by means of a somewhat larger generally cylindrical longitudinally extending rear support rod 10. Similarly, the forward ends of transverse rod members 9 are supported by means of a longitudinally extending generally cylindrical front support rod 11. If desired, one or more longitudinally extending intermediate support rods 12 may also be provided between rear support rod 10 and front support rod 11.

A lower front support rod 13 vertically spaced below front support rod 11 is attached thereto by a pair of spaced vertically extending hanger rods 14. The members forming shelf 2 may be constructed from cold drawn steel rod or other rigid material, and may be joined by resistance welding or the like. In addition, the surfaces of the shelf may be coated with a hard non-porous durable surface such as epoxy or the like. It will be observed that the upper surface of shelf 2 provides a convenient horizontally oriented storage location for articles, while lower front support rod 13 provides a convenient support for clothes hangers and the like.

The rear edge of shelf 2 formed by rear support rod 10 is supported at a plurality of spaced locations by means of back clip anchors 3. As best shown in FIG. 3, each back clip anchor includes a J-shaped hanger element 15 having a planar web portion 16 terminating at its lower end in a forwardly directed upturned arcuate portion 17 dimensioned to accept rear support rod 10. The rear surface 18 of web portion 16 has a relatively smooth surface and is configured to abut the forward face 4a of vertical wall surface 4 as shown in FIG. 2.

A hollow cylindrical sleeve 19 constructed of a flexible material such as nylon or the like, extends rearwardly from web portion 16 a distance approximately twice the thickness of wall 4. Sleeve 19 includes a pair of diametrically opposed slits 20 extending longitudinally through the walls of the sleeve from a point spaced from the forward end of the sleeve a distance approximately equal to the thickness of wall 4, to a point spaced from the rearward end of the sleeve. A pair of spaced oval-shaped cutouts 21 intersect along their minor diameters each of longitudinally extending slits 20, the portions of the sleeve between slits 20 forming an upper flexible strip 22 and a lower flexible strip 23.

Means are also provided for drawing the rearward-most end of sleeve 19 toward web portion 16 such that strips 22 and 23 bend outwardly near cutouts 21 to form a pair of oppositely directed outwardly extending V-shaped ears 24 and 25, respectively, with each ear having a front surface 26 configured to be urged against the rear face 4b of rear wall surface 4 as best shown in FIG. 2.

In a preferred embodiment, the drawing means includes a threaded bolt or fastener 27 extending through a clearance hole 28 in web portion 16 and extending coaxially within sleeve 19. The forward end of threaded fastener 27 terminates in a headed portion 29 bearing a suitable screwdriver drive slot 30. The rear end of threaded fastener 27 threadedly engages a nut 31 nonrotatably secured to the rear end of sleeve 19.

Back clip anchor 3 is installed by inserting the unexpanded hollow sleeve 19 through a suitable clearance hole 32 provided through wall 4. As threaded fastener 27 is rotated by means of a screwdriver or the like provided in screwdriver drive slot 30, nut 31 and the rear end of sleeve 19 are drawn forwardly, causing upper and lower flexible strips 22 and 23 to expand outwardly to form V-shaped ears 24 and 25, thereby securely holding the back clip anchor 3 to the supporting wall, and preventing the anchor from pulling out of the relatively chalky hole 32 provided in the dry wall.

A clip portion 33 has its lower edge hingedly attached to the upper end of web portion 16 by means of a flexible attachment portion 34 formed as an integral part of web member 16 and clip portion 33. Clip portion 33 includes an arcuately shaped portion 35 configured to accept headed portion 29 of threaded fastener 27 when the back clip anchor is in the closed position as will be described in more detail hereinafter. The outer end of clip portion 33 terminates in an outwardly extending tab 36 having a locking edge 37 and an concave portion 38. When clip portion 33 is pivoted downwardly to the position shown in FIG. 4, locking edge 38 may be urged past the upper edge 39 of arcuate portion 17 of J-shaped hanger element 15, urging this portion of the hanger element outwardly. When locking edge 37 has passed the inner edge of arcuate portion 17, this arcuate portion returns to its unbiased position, thereby locking the tab in place to prevent displacement of rear support rod 10 from between arcuate portion 17 and concave portion 38. If it becomes necessary to remove the shelf from back clip anchors 3, arcuate portion 17 may be biased outwardly, permitting locking edge 37 to slip past, thereby freeing rear support rod 10.

It will be observed that back clip anchor 3 may be fabricated in one integral piece of any suitable flexible material such as plastic or the like. It has been found that a back clip anchor fabricated from nylon in accordance with the principles of the present invention provides excellent results.

The forward edge of shelf 2 is supported from rear wall 4 by means of support brace 5. Support brace 5 comprises a rigid channel-shaped brace member 40 terminating at its lower end in a flat angularly disposed tab member 41 for mounting the brace member to vertical wall surface 4 such that the brace extends upwardly and forwardly between the wall and the forward edge of shelf 2 at an angle of approximately 45°. Tab member 41 contains a centrally located diamond-shaped aperture 42 dimensioned to accept mounting anchor 6 as will be described in more detail hereinafter.

The upper or opposite end of brace member 40 terminates in clip means for engaging upper and lower front support rods 11 and 13, respectively, of shelf 2. The clip means comprise a downwardly directed arcuate portion 43 dimensioned to slip over upper front support rod 11 as shown in FIG. 7. Downwardly directed arcuate portion 43 is attached to brace member 40 by means of an oppositely curved arcuate portion 44 and permits a degree of fluxure or bending between brace member 40 and the clip means located at its upper end. The forward end of downwardly directed arcuate portion 43 terminates in a downwardly depending planar web portion 45 such that it normally forms an angle of about 45°–90° with respect to brace member 40. The lower end of planar web portion 45 terminates in a rearwardly directed hook-like tab 46 which is curved to conform to the upper rear surface of lower front support rod 13.

Support brace 5 is installed by slipping arcuate portion 43 downwardly over upper front support rod 11 such that hook-like tab 46 overlies the upper inner surface of lower front support rod 13. Brace member 40 is then bent downwardly at approximately a 45° angle until tab member 41 abuts the forward face 4a of wall 4. The lower end of the support brace 5 may then be secured to the wall by means of anchor member 6 which passes through diamond-shaped aperture 42 and a predrilled through hole 47 in wall 4. It will be observed that this arrangement locks the upper end of the support brace 5 in place to prevent displacement from the forward edge of the shelf since the opening between oppositely arcuate portion 44 and planar web portion is smaller than the diameter of support rod 11.

Anchor member 6 is similar in construction to the rearmost portion of back clip anchor 3 described hereinabove, and includes a hollow cylindrical sleeve 19 constructed of a flexible material such as nylon or the like. The sleeve includes a pair of diametrically opposed slits, one of which is shown at 20, extending longitudinally through the walls of the sleeve from a point spaced from the forward end of the sleeve a distance approximately equal to the wall thickness to a point spaced from the rearward end of the sleeve. A pair of spaced oval-shaped cutouts 21 intersect the slits along their minor diameters, the areas between the slits forming an upper flexible strip 22 and a lower flexible strip 23. The forward end of sleeve 19 terminates in an outwardly directed flange 48 and a plurality of tooth-like projections one of which is shown at 49, connecting the rear surface of flange 48 to sleeve 19. Toothlike projections 49 are configured and dimensioned to mesh with diamond-shaped aperture 42 of support brace 5 to prevent rotation between the support brace and anchor member 6.

The anchor member is also supplied with a nut 31 nonrotatably secured to the rearmost end of sleeve 19, which threadedly engages a threaded fastener 27. As best shown in FIG. 7, when threaded fastener 27 is rotated, nut 31 is drawn forwardly causing strips 22 and 23 to bend outwardly in the area of cutouts 21 to form a pair of oppositely directed outwardly extending V-shaped ears 24 and 25 having forward surfaces 26 configured to be urged against the back surface 4b of wall 4, thereby securely mounting support brace 5 in place. It will be observed that anchor member 6 may be used in other ways for fastening or mounting members to walls constructed of dry wall and the like.

FIG. 5 illustrates end bracket 7 which is used to support either end of shelf 2 in association with a side wall 8. End bracket 7 includes a vertical web portion 50 having a rear surface configured to abut the front face of side wall 8. A pair of spaced parallel vertical flange portions 51 extend forwardly from the outer edges of web portion 50. A horizontally extending floor member 52 is supported along its side and rear edges by vertical web portion 50 and vertical flange portions 51 for supporting lower front support rod 13.

Means are also provided for attaching end bracket 7 to the adjacent wall comprising a pair of vertically spaced anchors 53 extending rearwardly from vertical web portion 50. Each of anchors 53, which may be formed as an integral or separate part of vertical web portion 50, is similar in construction and operation to the anchor portion associated with back clip anchor 3 and anchor member 6 described hereinabove. It will be understood the anchors 53 are inserted in suitably provided spaced through holes in side wall 9. Threaded fastener 27 is then rotated to cause the anchors to expand to hold end bracket 7 securely against the wall surface. As in the case of back clip anchor 3, end bracket 7 may be provided of any suitable plastic material such as nylon or the like, and may be fabricated in separate parts or in one integral piece.

It will be understood that various changes in the details, materials, steps and arrangements of parts, which have been herein described and illustrated in order to explain the nature of the invention, may be made by those skilled in the art within the principle and scope of the invention as expressed in the appended claims.

The embodiments of the invention in which an exclusive property or privilege is claimed are as follows:

1. Shelf apparatus comprising:
    a shelf defining a generally planar horizontal surface composed of a plurality of parallel spaced transversely extending rod members connected by longitudinally extending spaced front and rear support rods positioned adjacent the front and rear edges, respectively, of said shelf and including a lower support rod extending parallel to and vertically spaced beneath said front support rod;
    a back clip anchor mounting said rear support rod to an adjacent vertically extending wall, said back clip comprising hanger means for supporting said rear support rod, locking means connected to said hanger means for preventing displacement of said rear support rod therefrom, and an expandable anchor for securing said hanger means to the wall; and
    means for supporting the front edge of said shelf comprising a support brace including a rigid brace member terminating at its lower end in an angularly disposed tab for mounting to the wall such that the brace member extends upwardly and forwardly between the wall and the forward edge of the shelf, the upper end of said support brace terminating in clip means for lockingly engaging said front and lower support bars comprising a downwardly directed arcuate portion configured to slip over said front support bar and a web portion depending downwardly from said arcuate portion at an angle of about 45°–90° with respect to said brace member, said web member terminating in a rearwardly directed hook-like tab configured to abut the upper rear surface of said lower support bar, said brace being bendable downwardly along said arcuate portion to lock said front support bar within said arcuate portion when the mounting tab is in abutting engagement with the vertical wall surface.

2. The shelf apparatus according to claim 1 wherein said back clip anchor comprises a J-shaped hanger element having a planar web portion terminating at its lower end in a forwardly directed upturned arcuate portion dimensioned to accept said rear support rod, the rear surface of said web portion being configured to abut the vertical wall surface;

a clip portion having one end hingedly secured to the upper end of said web portion, the lower end of said clip portion terminating in an outwardly extending tab, said tab being locked in place within said arcuate portion when said clip portion is pivoted toward said arcuate portion to prevent displacement of said rear support rod from within said arcuate portion; and means for attaching said clip to the wall comprising an expandable anchor extending rearwardly from said web portion and insertable in a cooperating hole provided in the wall.

3. The shelf apparatus according to claim 1 wherein the angularly disposed tab of said brace member is secured to the vertical wall by means of an expandable anchor, said anchor comprising a hollow cylindrical sleeve constructed of a flexible material, said sleeve including a pair of diametrically opposed slits extending longitudinally through the walls of said sleeve from a point spaced from the forward end of said sleeve a distance approximately equal to the wall thickness to a point spaced from the rearward end of said sleeve and a pair of spaced oval-shaped cutouts intersecting along their minor diameters each of said slits, the areas between said slits forming a pair of flexible strips, a threaded nut non-rotatably secured to the rearmost end of said sleeve, a threaded fastener extending within said sleeve and threadedly engaging said nut, said fastener including a headed portion for rotating said fastener to cause the rearmost end of said sleeve to be drawn forwardly thereby causing said strips to bend outwardly to form a pair of oppositely directed outwardly extending V-shaped ears having forward surfaces configured to be urged against the back face of the supporting wall, and means for preventing rotation between said sleeve and said angularly disposed tab.

4. The shelf apparatus according to claim 1 wherein said supporting means also includes an end bracket for supporting an end of said shelf from a side wall extending perpendicularly to said vertically extending wall, said end bracket comprising a vertical web portion having a rear surface configured to abut the front surface of the adjacent side wall;

a pair of spaced parallel vertical flange portions extending forwardly from said web portion;

a horizontally extending floor member supported along its edges by said web and flange members for supporting said front support rod; and means for attaching the bracket to the wall comprising a pair of vertically spaced expandable anchors extending rearwardly from said web and insertable in cooperating holes provided in the adjacent wall.

5. The shelf apparatus according to claim 4 wherein said anchors comprise a hollow cylindrical sleeve constructed of a flexible material, said sleeve including a pair of diametrically opposed slits extending longitudinally through the walls of said sleeve from a point spaced from the forward end of said sleeve a distance approximately equal to the supporting wall thickness to a point spaced from the rearward end of said sleeve, the areas between said slits forming a pair of flexible strips, a threaded nut non-rotatably secured to the rearmost end of said sleeve, a threaded fastener extending coaxially within said sleeve and threadedly engaging said nut, said fastener including a headed portion adjacent the forward surface of said web portion for rotating said fastener to cause the rearmost end of said sleeve to be drawn forwardly thereby causing said strips to bend outwardly to form a pair of oppositely directed outwardly extending V-shaped ears having forward surfaces configured to be urged against the back face of the supporting wall.

6. The shelf apparatus according to claim 1 wherein said hanger means comprises a J-shaped hanger element having a planar web portion terminating at its lower end in a forwardly directed upturned arcuate portion dimensioned to accept said rear support rod, the rear surface of said web portion being configured to abut the vertical wall surface, said locking means comprises a clip portion formed as an integral part of and having one end hingedly secured to the upper end of said web portion, the lower end of said clip portion terminating in an outwardly extending tab, said tab being locked in place within said arcuate portion when said clip portion is pivoted toward said arcuate portion to prevent displacement of said rear support rod within said arcuate portion, said hanger means, locking means and expandable anchor being formed in one piece, an expandable anchor member for securing the tab member of said brace member to the adjoining wall surface, said front shelf edge supporting means further comprising an end bracket for support the front corner of the shelf comprising a vertical web portion having a rear surface configured to abut the front surface of an adjacent vertical wall, a pair of spaced parallel vertical flange portions extending forwardly from said web portion, a horizontally extending floor member supported along its edges by said web and flange members for supporting said lower support bar, and means for attaching the bracket to the wall comprising a pair of vertically spaced expandable anchors extending rearwardly from said web and insertable in cooperating holes provided in the supporting wall, said vertical web portion, vertical flange portions, floor member and expandable anchors being formed in one piece, said expandable anchors each comprising a hollow cylindrical sleeve constructed of a flexible material, each sleeve including a pair of diametrically opposed slits extending longitudinally through the walls of said sleeve from a point spaced from the forward end of said sleeve a distance approximately equal to the supporting wall thickness to a point spaced from the rearward end of said sleeve and a pair of spaced oval-shaped cut outs intersecting along their minor diameters each of said slits, the areas between said slits forming a pair of flexible strips, a threaded nut non-rotatably secured to the rearmost end of said sleeve, a threaded fastener extending coaxially within said sleeve and threadedly engaging said nut, said fastener including a headed portion adjacent the forward surface of said web portion for rotating said fastener to cause the rearmost end of said sleeve to be drawn forwardly thereby causing said strips to bend outwardly to form a pair of oppositely directed outwardly extended V-shaped ears having forward surfaces configured to be urged against the back face of the supporting wall.

7. A support brace for supporting from a vertical wall surface the front edge of a shelf defining a generally planar surface and having a pair of vertically spaced parallel rod members extending longitudinally across the front edge of the shelf, said support brace comprising:

a rigid channel-shaped brace member terminating at one end in a flat angularly disposed tab member for mounting to the vertical wall surface such that said brace extends upwardly and forwardly between the wall and the forward edge of the shelf, the opposite end of said brace member terminating in clip means for engaging the shelf rod members, said clip means comprising a downwardly directed arcuate portion configured to slip over the upper one of said rod members and a web portion depending downwardly from said arcuate portion at an angle of about 45°–90° with respect to said brace member, said web member terminating in a rearwardly directed hook-like tab configured to abut the upper rear surface of the lower shelf rod member, said brace being bendable downwardly along said arcuate portion to lock the upper shelf rod member within said arcuate portion when the mounting tab is in abutting engagement with the vertical wall surface.

8. The support brace according to claim 7 including an expandable anchor for securing said tab member to the adjoining wall surface.

9. The apparatus according to claim 8 wherein said expandable anchor comprises a hollow cylindrical sleeve constructed of a flexible material, said sleeve including a pair of diametrically opposed slits extending longitudinally through the walls of said sleeve from a point spaced from the forward end of said sleeve a distance approximately equal to the wall thickness to a point spaced from the rearward end of said sleeve, the areas between said slits forming a pair of flexible strips, a threaded nut non-rotatably secured to the rearmost end of said sleeve, a threaded fastener extending coaxially within said sleeve and threadedly engaging said nut, said fastener including a headed portion for rotating said fastener to cause the rearmost end of said sleeve to be drawn forwardly thereby causing said strips to bend outwardly to form a pair of oppositely directed outwardly extending V-shaped ears having forward surfaces configured to be urged against the back face of the supporting wall.

10. The apparatus according to claim 9 including a pair of spaced oval-shaped cutouts intersecting along their minor diameters each of said slits.

* * * * *